United States Patent [19]
Madsen et al.

[11] Patent Number: 5,547,127
[45] Date of Patent: Aug. 20, 1996

[54] METHOD FOR UTILIZATION OF HEAT ENERGY IN A DISTRICT HEATING NETWORK FROM A GENERATING PLANT WITH AN AIR-COOLED GENERATOR POWERED BY AN INTERNAL COMBUSTION ENGINE, AND A GENERATING PLANT PERFORMING THE METHOD

[75] Inventors: Søren M. Madsen, Frederiksberg; Jan Stromvig, Odense, both of Denmark

[73] Assignee: Krüger Systems AS, Soborg, Denmark

[21] Appl. No.: 244,196
[22] PCT Filed: Nov. 27, 1992
[86] PCT No.: PCT/DK92/00353
 § 371 Date: Oct. 28, 1994
 § 102(e) Date: Oct. 28, 1994
[87] PCT Pub. No.: WO93/11354
 PCT Pub. Date: Jun. 10, 1993

[30] Foreign Application Priority Data

Nov. 28, 1991 [DK] Denmark .................... 1931/91

[51] Int. Cl.$^6$ ........................................... F24D 5/00
[52] U.S. Cl. .................................. 237/12.1; 290/2
[58] Field of Search ............................ 237/12.1; 290/2

[56] References Cited

U.S. PATENT DOCUMENTS

| | | | |
|---|---|---|---|
| 2,961,550 | 11/1960 | Dittman | 290/2 |
| 4,657,290 | 4/1987 | Linden | 290/2 |
| 4,680,478 | 7/1987 | Wicks | 290/2 |
| 4,736,111 | 4/1988 | Linden | 290/2 |
| 4,951,871 | 8/1990 | Hata et al. | 237/12.1 |

FOREIGN PATENT DOCUMENTS

| | | |
|---|---|---|
| 0152121 | 8/1985 | European Pat. Off. . |
| 0268726 | 6/1988 | European Pat. Off. . |
| 8604114 | 7/1986 | WIPO . |
| 8703933 | 7/1987 | WIPO . |

*Primary Examiner*—William E. Tapolcai
*Attorney, Agent, or Firm*—Kerkam, Stowell, Kondracki & Clarke; Dennis P. Clarke

[57] ABSTRACT

An apparatus for extracting thermal energy for use in a heat distributing plant, for instance a district heating system, from a generator plant having a generator, which is air-cooled by means of a cooling ventilator and driven by means of an internal combustion engine, according to which apparatus thermal energy from the cooling system and exhaust gas are transferred to the district heating system, and in which the internal combustion engine is enclosed in a sound-absorbing, ventilated cabinet. With a view to being able to exploit the heat transferred to the ventilation air through direct heat exchange with the water in the district heating system, the generator is supplied with cooling air from an external cooling ventilator, and the cooling air outlet is supplied to the cabinet, where it constitutes the whole amount of the ventilation air or an essential part thereof.

3 Claims, 1 Drawing Sheet

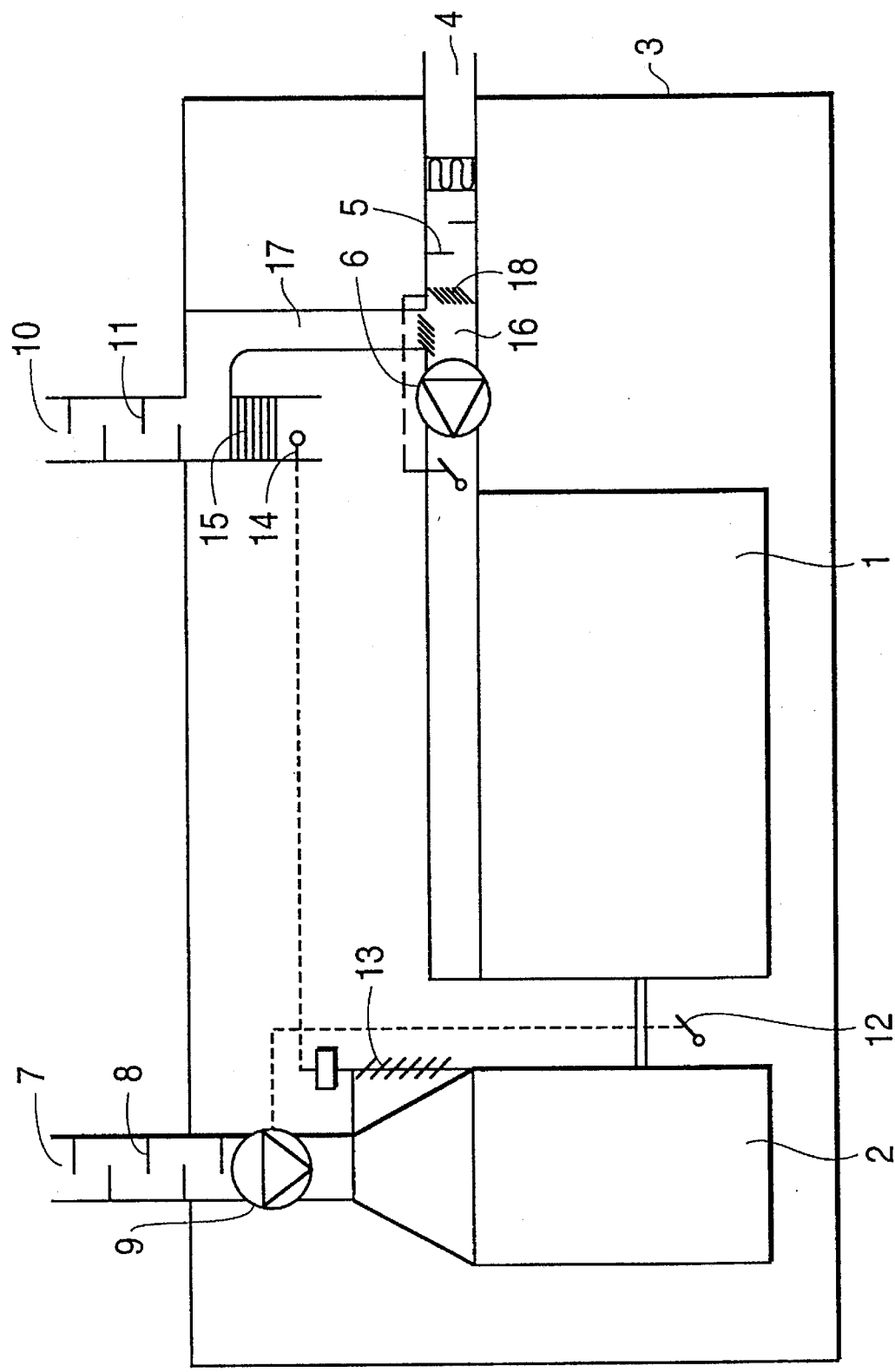

METHOD FOR UTILIZATION OF HEAT ENERGY IN A DISTRICT HEATING NETWORK FROM A GENERATING PLANT WITH AN AIR-COOLED GENERATOR POWERED BY AN INTERNAL COMBUSTION ENGINE, AND A GENERATING PLANT PERFORMING THE METHOD

The present invention relates to a method for extracting thermal energy for use in a heat distributing plant and of the kind stated in the preamble of claim 1, as well as to a combined heat and power plant for performing the method.

Heat distributing plants are normally supplied with thermal energy from a boiler fired by coal, oil or gas, but recently heat distributing plants have been built or planned, in which a major or smaller part of the thermal supply derives from cooling of an internal combustion engine driving a generator coupled in the public electricity supply system. The most common form of such heat distributing systems supply district heating to dwelling houses, and in the following the term district heating system is used generally about such heat distributing plants. It is normal practice to equip smaller generators with a shaft-driven ventilator, which is normally somewhat oversized and which circulates the air surrounding the generator around its electrical windings. To attain sufficient cooling the ambient air should be kept at a comparatively low level. To avoid noise nuisances the generator and the motor are usually placed in the same sound-absorbing cabinet, and it should therefore be ventilated to such an extent that sufficient cooling of the generator is attained. In the plant thus outlined, the heat, which is present in the used ventilation air, will be discarded due to the fact that it is present at a temperature level, at which it cannot be exploited in the district heating system without a heat pump.

The heat loss, which has up until now been accepted it such a combined heat and power plant, amounts to approx. 12–15% of the effect fired into the plant, but even though the loss is considerable, it has on account of the low temperature level of this amount of heat not been considered profitable to recover it.

From the specification to U.S. Pat. No. 4,680,478 a gas engine generator plant with heat recovery built into a closed, sound-absorbing cabinet is known. In this plant a ventilator ensures the presence of a cooling air flow in the cabinet, the cooling air passing in its flow path in series condensing heat exchangers for exhaust gas from the engine, the generator, the cooling ribs of the motor and a primary exhaust gas cooler. The cooling air is supplied in comparatively big amounts to ensure an effective cooling of the various components, and the cooling air outlet therefore only reaches a temperature of approx. 55° C., which is not sufficient for heating circulation water in the heat distributing system, but only sufficient for being used for direct in-blowing in an air-heated house, which on account of the difficulties in connection with transferring air heat over bigger distances should be present in the immediate vicinity of the generator plant. The direct contact between the cooling air used for heating and the cooled machines entails a risk of obnoxious smells and exudation of hydrocarbon.

EP-A-0 152 121 discloses a heat pump apparatus. Thermal energy is extracted for use in a heat distribution plant from a generator plant having an air cooled generator enclosed in a common cabinet together with a combustion engine. The generator is cooled with the ventilation air passing through the cabinet. Thermal energy from the cooling system and exhaust gas is transferred to the district heating system. The cooling air from the generator constitutes part of the ventilation air in the cabinet and is part of the low temperature heat source for the heat pump. In the known apparatus a heat pump is an indispensable component, which adds to the cost and maintenance of the apparatus.

The object of the present invention is to provide a method for profitable recovery of essential parts of the amount of heat mentioned in connection with district heating systems and avoiding the complication of using a heat pump. The invention exploits the sound-absorbing cabinet for reduction of the dissipation of heat to the surroundings and is based on the perception that the engine has a considerably bigger tolerance with respect to the ventilation air temperature than the generator.

According to the invention the profitable recovery may be attained thereby that the method is characterized by the subject matter of the characterizing clause of claim 1.

In the method according to the invention cooling air from the generator is used as ventilation air around the engine. By means of the external cooling air supply the amount of cooling air is reduced to correspond substantially to the cooling requirement of the generator. As the used cooling air from the generator also has a temperature exceeding that of the surroundings but closer to the surface temperature of the engine, the possible heat given off from the engine to the ventilation air is reduced, the cooling requirement of the engine then having to be met by the cooling water system of the engine, which then transfers the surplus heat from the engine to the district heating system by heat exchange.

The higher the temperature to be ventilated around the engine the better will the heat absorbed by the ventilation air be recoverable. According to the invention the temperature at the ventilation air outlet is made to exceed the outlet water temperature in the district heating system, whereby heat from the outlet air may be recovered. The reduced external cooling, which is compensated for by further heat exchange with the cooling water of the engine, results in an improved total heat recovery. Optimally, the ventilation air outlet is adjusted to a temperature corresponding to or being somewhat higher than the temperature of the cooling water, whereby the conditions for heat exchange with the district heating water become the best possible. After heat exchange with the outlet water of the district heating it is according to the invention still possible to exploit residual heat in the ventilation air for tempering the inlet air of the engine to keep it at a constant level corresponding to the adjusted carburetting.

By the method according to the invention it is possible to obtain an increased heat yield of up to 8–10% of the fired effect compared with a method, in which the ventilation and cooling air are discarded without heat recovery. The method does not entail additional costs of construction provided the cooling circuit of the engine is sufficiently dimensioned for meeting the increased cooling requirement caused by the higher temperature around the engine.

The invention further comprises a combined heat and power plant for performing the method according to claim 1. The combined heat and power plant is defined in claim 4, and advantageous embodiments are described in claims 5–9.

The invention will be described in detail in the following with reference to the drawing, the only FIGURE of which schematically shows a combined heat and power plant according to the invention.

The combined heat and power plant shown in the drawing comprises an internal combustion engine 1 and an electric generator 2. On account of the noise made by the engine the engine and the generator are placed in a cabinet 3 made from a sound-absorbing material. The sound-absorbing material may be chosen with a further effective heat insulation, a possible heat release from the interior of the cabinet to the surroundings being then minimized.

The motor 1 is provided with an air inlet 4 with a silencing means 5. In the air inlet a ventilator 6 may further be provided, said ventilator partly compensating for the resistance encountered by the air in the silencing means and partly giving the engine a mild supercharge which equalizes variations in the air pressure.

The cabinet 3 is provided with an air inlet 7 for ventilation air for cooling of the generator 2 and ventilation of gases and vapours, which may be emitted by the engine 1. The air inlet 7 is provided with a silencing means 8 and a ventilator 9. The ventilator 9 guides the air entering through the air inlet 7 directly to the generator 2, where it conducts the heat away, which has been created in the electric and magnetic circuits. According to the invention the used cooling air is transferred from the generator to the interior of the cabinet 3. The air is again admitted to the surroundings through an air outlet 10, which is likewise provided with a silencing means 11.

The used cooling air from the heat generator 2 has an increased temperature in relation to the surroundings. The temperature is adjusted by means of a thermostat 12 adapted to adjust the number of revolutions of the ventilator 9 in such a way that the generator is only cooled to the required extent. In that way the cooling air will after use have a temperature corresponding substantially to the operating temperature of the generator, for instance 50° C. This temperature may advantageously be higher, if the electrical insulation of the generator permits a higher temperature. The heated air is conducted past the internal combustion engine 1, from which the air on account of its relatively high temperature is unable to take up essential amounts of heat. The cooling of the engine therefore has to take place primarily by means of heat exchangers built into the cooling and lubricating systems of the engine. They have in advance, however, to be kept at such high temperatures, that heat exchange by means of returned water from the district heating system may take place, the heat exchangers and accompanying circulation pumps just having to be adequately dimensioned, which will normally not present any problems or entail essential economic consequences.

To avoid excess heating of the hottest parts of the engine and to keep the fixed minimum requirements to the amount of ventilation air, an adjustable throttle valve 13 may be positioned after the ventilator 9, said throttle valve being controlled by a thermostat 14 placed in advance of the air outlet 10. The temperature at the air outlet may therefore permanently be kept at a comparatively high and constant level, for instance 75° C., whereby a heat exchanger 15 placed in the air outlet 11 will be able to transfer heat for instance to the district heating station. There is no maximum limit to the temperature, as it may very well be that the ventilation air acquires so high a temperature that it gives off heat to the cooling water system of the engine. After the heat exchange, the outlet air will still contain such an amount of heat that part of the outlet air may be mixed or heat-exchanged with the air introduced through the air inlet 4, which keeps it at a constant temperature, for instance 27° C., which is a common requirement for several gas engine types. The heating of the inlet air may take place in a mixing box 16 placed in the air inlet, said mixing box being connected with the ventilation air outlet 10 by means of a duct 17. By means of a thermostatically controlled valve 18, the mixing ratio between hot air from the ventilation air outlet 10 and air from the air inlet 4 is controlled in such a way that the desired temperature is obtained.

By the method for recovery of heat energy from the combined heat and power plant the heat dissipation from the exterior surfaces of the engine is reduced to a minimum, whereby its requirement as to cooling is to be met solely through cooling by oil and water. This cooling, however, takes place by a heat exchange at a temperature level corresponding to the normal temperature of district heating, and the recovery may take place without any problems and without the use of heat pumps or similar costly installations. The invention is based on the perception that internal combustion engines emit considerable amounts of heat from their exterior surfaces to the surroundings in the form of a non-exploitable amount of heat, but also on the perception that the operational reliability of the engine is not normally dependent on this surface cooling, when due regard is being had to cooling of electrical installations, such as for instance current controller, etc. The invention is simultaneously based on the perception that a pre-heating of the ventilation air around the engine by means of the inevitable generator cooling is an advantage both with respect to minimizing the total amount of ventilation air, but also to creating a possibility of utilization of the heat energy cooled away from the generator. By thus reducing the desultory emission of heat, the heat emission may be transformed to a heat emission at higher temperatures through cooling water and oil. The improved controlling of the heat emission entails a gain in respect of heat recovery corresponding to 8–10% of the fared effect without essential installation costs.

We claim:

1. A combined heat and power plant for the production of thermal energy, which can be exploited in a heat distributing plant, said plant comprising a generator which is air-cooled by means of a cooling ventilator and driven by means of a combustion engine enclosed in a sound-absorbing, ventilated cabinet, the cooling water and the exhaust gas of which are passed through heat exchangers inserted in the heat distributing plant, and in which the cooling air outletted from the generator is transferred to the cabinet, characterized in that the cooling air ventilator is power regulated and controlled by a thermostat placed in the cabinet, and in that the thermostat is placed in the cooling air outletted from the generator, and in that a further thermostat placed in the outlet from the cabinet is adapted to control a bypass in the generator cooling placed upstream with respect to the generator.

2. A combined heat and power plant according to claim 1, characterized in that in the ventilation air outlet of the cabinet a heat exchanger (15), which is cooled by return water from the heat distributing plant, is positioned.

3. A combined heat and power plant for the production of thermal energy, which can be exploited in a heat distributing plant, said plant comprising a generator which is air-cooled by means of a cooling ventilator and driven by means of a combustion engine enclosed in a sound-absorbing, ventilated cabinet, the cooling water and the exhaust gas of which are passed through heat exchangers inserted in the heat distributing plant, and in which the cooling air outletted from the generator is transferred to the cabinet, characterized in that the cooling air ventilator is power regulated and controlled by a thermostat placed in the cabinet, and in that the air intake of the engine contains a heat exchanger or mixing box for heat exchange with the ventilation air outlet.

* * * * *